US008694470B2

United States Patent
Sha

(10) Patent No.: US 8,694,470 B2
(45) Date of Patent: Apr. 8, 2014

(54) MOBILE TERMINAL ENVIRONMENT SNAPSHOT MANAGEMENT AND BACKUP RECOVERY

(75) Inventor: Jinchuan Sha, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 13/574,916

(22) PCT Filed: Apr. 21, 2010

(86) PCT No.: PCT/CN2010/071955
§ 371 (c)(1),
(2), (4) Date: Jul. 24, 2012

(87) PCT Pub. No.: WO2011/097838
PCT Pub. Date: Aug. 18, 2011

(65) Prior Publication Data
US 2012/0303589 A1 Nov. 29, 2012

(30) Foreign Application Priority Data
Feb. 9, 2010 (CN) .......................... 2010 1 0112043

(51) Int. Cl.
*G06F 17/30* (2006.01)
(52) U.S. Cl.
USPC ............................ 707/653; 707/649; 707/676
(58) Field of Classification Search
USPC .................................. 707/674, 649, 653, 676
See application file for complete search history.

(56) References Cited

U.S. PATENT DOCUMENTS

| | | | |
|---|---|---|---|
| 6,992,991 B2 * | 1/2006 | Duske et al. ................ | 370/316 |
| 7,917,182 B2 * | 3/2011 | Zhang et al. ................ | 455/567 |
| 2003/0117436 A1 * | 6/2003 | Kautto-Koivula et al. ... | 345/762 |
| 2005/0223352 A1 * | 10/2005 | Nishida ...................... | 717/100 |
| 2010/0042826 A1 * | 2/2010 | Bull et al. ................... | 713/100 |
| 2010/0325254 A1 * | 12/2010 | Sun ............................ | 709/222 |

FOREIGN PATENT DOCUMENTS

| | | |
|---|---|---|
| CN | 101403981 A | 4/2009 |
| CN | 101488989 A | 7/2009 |
| CN | 101631167 A | 1/2010 |

OTHER PUBLICATIONS

International Search Report for PCT/CN2010/071955 dated Nov. 8, 2010.

* cited by examiner

*Primary Examiner* — Rehana Perveen
*Assistant Examiner* — Scott A Waldron
(74) *Attorney, Agent, or Firm* — Ling Wu; Stephen Yang; Ling and Yang Intellectual Property

(57) ABSTRACT

A method and mobile terminal for mobile terminal environment snapshot management and backup recovery to define different working environment snapshots, and to back up and recover the environment snapshots according to the user's selection, so as to provide more flexible ways of using the mobile terminal.

8 Claims, 5 Drawing Sheets

MOBILE TERMINAL ENVIRONMENT SNAPSHOT MANAGEMENT AND BACKUP RECOVERY

TECHNICAL FIELD

The present invention relates to technologies of the environment snapshot management and backup recovery when a mobile terminal is running, and more specifically, to a method and device for environment snapshot management and backup recovery when a mobile terminal is running

BACKGROUND OF THE RELATED ART

With the development of the mobile terminal technology and an increasingly important position occupied by it in the user's daily life, the mobile terminal is not just a contact tool in the future but more likely to become a mobile work platform. The smart mobile terminal has the features of: having the support of a powerful operating system, allowing users to run multiple applications simultaneously; in addition to traditional applications such as short messages, phones, and so on, allowing users to easily install and remove the third-party applications.

The advantages of mobility and portability make the mobile terminal increasingly used in the daily life and work, especially, in the diverse working scenes of the business people: different time zones, different working environments, personalized configurations, scenes consisting of audio and video, graphics, images, text, regular text, the current using state of the application, and so on, and the mobile terminal users are provided with more flexible usage modes, if the switch can be performed quickly between different usage scenes of the mobile terminal, the user experience will be greatly enhanced.

However, currently the mobile terminal has no usage mode of the working scene but a simple data backup function, the users can simply back up and recover a data backup, for example, the current short messages, address book and other types of data content are saved as a backup. The backups at multiple time points use the ghost disk mirroring method, which has very large system overhead of the disk capacity and the mirroring recovery; if any method other than the disk mirroring is used for data backup, there is no such a good method that can uniformly recover the status of the local applications and the third party installation.

Since the business of the current terminal users is increasing, the requirements for the personalized usage scenes consisting of audios and videos, graphics, images, text, regular text, the current application usage status, and so on are more and more obvious, if the users can distinguishingly save the current usage scene according to different working and living scenes, the switch of work from one place to another or the switch from work to leisure only needs to be performed under different scenes, with both enhanced personalization and customization; avoiding to use the disk mirroring method will greatly enhance the user experience and performance of the terminal.

Therefore, how to define different working scenes and implement the backup and recovery according to the user's selection so as to provide more flexible ways of using the mobile terminal is a problem that the technical personnel should consider.

SUMMARY OF THE INVENTION

The technical problem to be solved in the present invention is to provide a method and device for mobile terminal environment snapshot management and backup recovery to define different working scenes, and to back up and recover the environment snapshots according to the user's selection, so as to provide more flexible ways of using the mobile terminal.

In order to solve the aforementioned technical problem, the present invention provides a method for mobile terminal environment snapshot management and backup recovery, comprising:

dividing objects for creating environment snapshots into three usage sets: general local configurations, local applications, and the third-party installations;

setting formats for saving the states of different usage sets of the mobile terminal for the potential needs of the corresponding recoveries;

creating different environment snapshot settings, wherein each environment snapshot setting including at least following information:

the formats for saving the states of different usages of the mobile terminal for the potential needs of the corresponding recoveries; and the activation sequences of the usages and the relationship of the usages;

when the mobile terminal creating an environment snapshot with the selected environment snapshot setting, the terminal first saving the current global configurations and then saving the terminal's current using states of each of the usages into environment records based on the preset formats;

when the mobile terminal recovering the environment snapshot, the mobile terminal recovering the saved global configurations, and then according to the saved activation sequences of the usages and the saved relationship of the usages recovering and activating the usage based on each of the saved environment records.

Furthermore, when the usage set is general local configurations, the environment record keeping the information of the terminal's global configurations;

when the usage set is local applications, the environment record keeping the mobile terminal's current using state of the local applications including at least the User Interface (UI) hierarchical relationship, commonly used configurations of the local applications, and the data currently cached and used on a top-layer UI page;

when the usage set is the third-party installations, the environment record keeping whether the third party installation applications are activated and objects used by the third party installation applications.

Furthermore, the step of saving the terminal's current using states of each of the usages into environment records based on the preset formats comprises: saving data being edited.

Furthermore, the method also comprises:

creating an emergency environment snapshot setting; in emergent events, creating the environment snapshot with the emergency environment snapshot setting.

In order to solve the aforementioned technical problem, the present invention also provides a mobile terminal with environment snapshot management and backup recovery function comprising:

a setting module dividing the objects for creating the environment snapshots into three usage sets: general local configurations, local applications, and the third-party installations; and setting the format for saving the states of different usage sets of the mobile terminal for the potential needs of the corresponding recoveries;

a storing module storing different environment snapshot settings, wherein each environment snapshot setting including at least following information:

the format for saving the states of different usages of the mobile terminal for the potential needs of the corresponding recoveries; and the activation sequences of the usages and the relationship of the usages;

an environment snapshot creating module creating the environment snapshot with the selected environment snapshot setting by first saving the current global configurations and then saving the terminal's current using states of each of the usages into environment records based on the preset formats;

an environment snapshot recovering module recovering the environment snapshot by recovering the saved global configurations first, and then according to the saved activation sequences of the usages and the relationship of the usages to recover and activate the usage based on each of the saved environment records.

Furthermore, when the usage set is general local configurations, the environment record keeping the information of the terminal's global configurations;

when the usage set is local applications, the environment record keeping the mobile terminal's current using state of the local applications including at least the User Interface (UI) hierarchical relationship, commonly used configurations of the local applications, and the data currently cached and used on a top-layer UI page;

when the usage set is the third-party installations, the environment record keeping whether the third party installation applications are activated and objects used by the third party installation applications.

Furthermore, said environment snapshot creating module is further used for save the data being edited.

Furthermore, the setting module is further used for: creating an emergency environment snapshot setting; and the environment snapshot creating module is further used to: in emergent events, creating the environment snapshot with the emergency environment snapshot setting.

With the method and device in the present invention, the application status comprising the status of each application program and the data being processed by the program in the mobile terminal can be saved; moreover, the present invention can recover the applications under each environment snapshot very well according to the saved activation sequences of the usages and the saved relationship of the usages. When the mobile terminal is in a critical status (for example the status of almost no power), the purpose of creating the emergency environment snapshots and saving the data being processed can be achieved, and the data are stored in a nonvolatile storage medium to be used for the next recovery, which effectively improves the security of the dynamic data. The method can greatly enrich the usage modes of the mobile terminal used by the users, facilitate to switch so as to be suitable for the requirements of work and life under different circumstances, and it is applicable to the emergency situations for the data backup. In summary, the present invention has positive assisting function in the enhancement of the user experiment of the mobile terminal.

PREFERRED EMBODIMENTS OF THE PRESENT INVENTION

Figure 1:
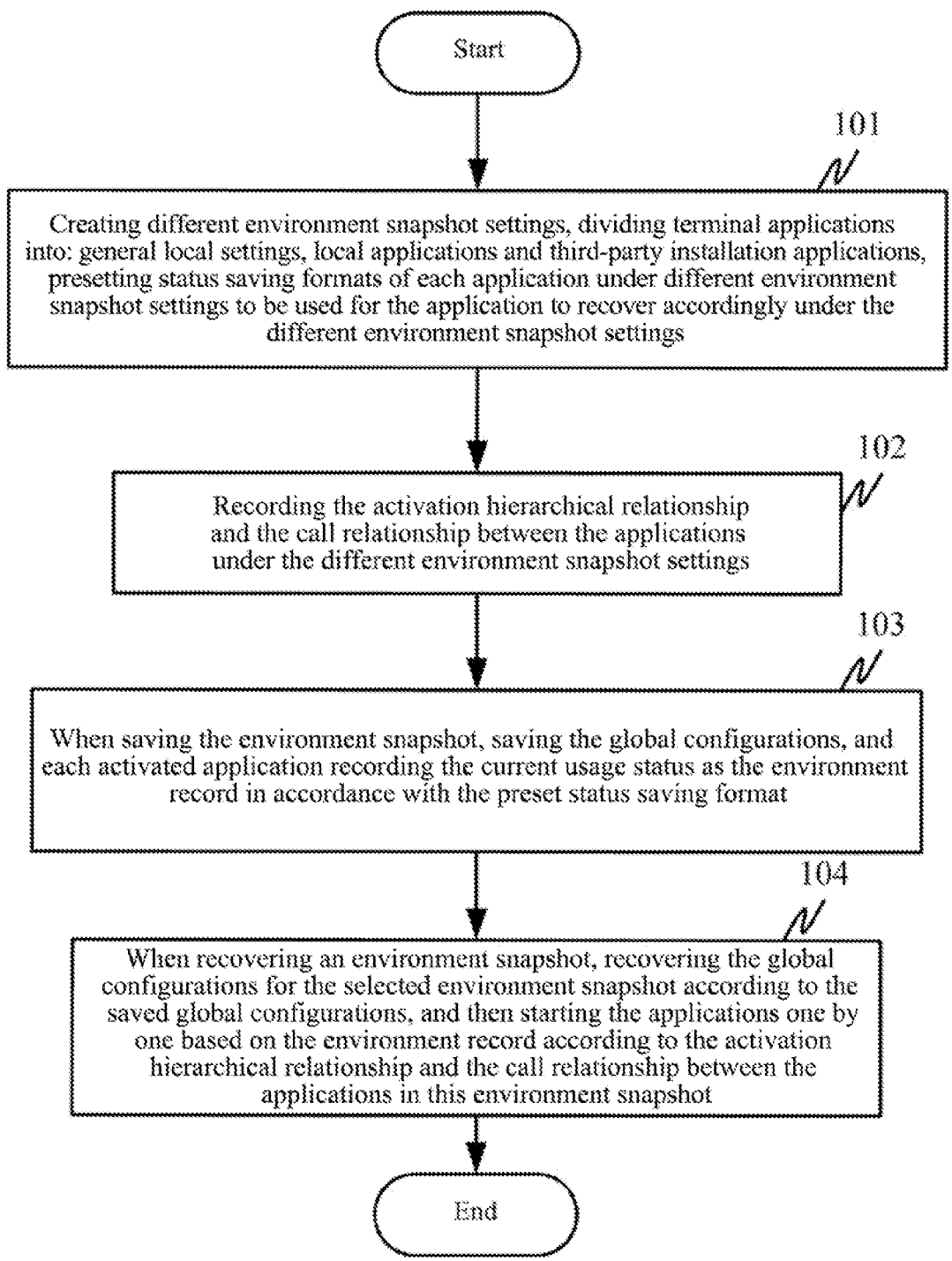
FIG. 1 is a flow chart of a method for mobile terminal environment snapshot management and backup recovery in accordance with the present invention.

The main idea of the present invention is to set create different environment snapshot settings and divide the terminal applications into: general local settings, local applications and third-party installation applications, preset the status saving formats of each application in different environment snapshot settings to be used for the application to recover accordingly in the specific environment snapshot setting; record the activation hierarchical relationship and the calling relationship between the applications in different environment snapshot settings; when saving an environment snapshot, save the global configurations, and each activated application records the current usage status as the environment record in accordance with the preset status saving format; when recovering an environment snapshot, recover the global configurations for the selected environment snapshot setting according to the saved global configurations, and then start the applications one by one based on the environment record according to the activation hierarchical and calling relationships of the applications in this environment snapshot setting.

The implementation of the present invention will be described below in further detail with reference to the accompanying drawings.

The implementation of the present invention is based on the following settings:

1. create different environment snapshot settings and divide the terminal applications into: general local settings, local applications and third-party installation applications, set the status saving formats of each application under different environment snapshot settings to be used for the application to recover accordingly in the different environment snapshot settings;

the status saving formats are mainly the data saving formats of the applications, such as the alarm clock, which is set with an item of 7:00 am, then there is an entry in the database to indicate this record.

Among them, the general local settings record the terminal global configurations, including the fonts, backgrounds, theme styles, telephone service ring tones, and so on; the local applications record the application usage status, including the user interface (UI) hierarchical relationship, the commonly used configurations of the applications, the data currently cached and used on the top-layer page, and so on; the third-party installation application records whether the application is activated or not and the object, such as the file storage path, used by the application in various scenes;

2. the application manager to be used to record an application activation list in a specific environment snapshot setting, where the application activation list records the terminal application usage status in the specific environment snapshot setting in accordance with the activation hierarchical relationship and the task calling relationship between the applications;

for example, the activation hierarchical relationship is the general application hierarchical relationship, for example, activate first when selecting to send a text message, if look up the address book and then activate, the text message is covered above the address book, and the address book is revealed after the short message exits. The task calling relationship comprises: whether the applications call each other or not. The application usage status comprises the specific status, including the saved data, and what is doing, such as a half of the data of a text message to be sent to his/her family.

3, establish a environment snapshot manager to save the global settings when saving the environment snapshot, request each activated application to record the current usage status as the environment record according to the status saving format; request the application manager to save the environment snapshot application activation list whose description is associated with the current environment record.

The global settings are the general setting items, such as background, font, and so on, rather than the application configuration. The application is self-explanatory on its own environment snapshot data, the manager does not need to know the saving format of the short messages and simply requires the application to save and restore.

Based on the above settings, when recovering an environment snapshot, the application manager restores the global configurations according to the selected environment snapshot setting, and then starts the applications one by one according to the call relationship between the applications under this environment snapshot setting, the startup of the application is performed according to the environment record; the environment snapshot saving mechanism may be associated with (optional) emergency event such as low power, timing saving, and so on; the environment snapshot saving may be associated with the current data, and may cover the data backup use (optional). The current data, such as the short message, may only record which the interface now it is, whether a half of the contents is to be completed, but all the short message information in the current database can be regarded as a part of the environment snapshot backup.

Wherein, the terminal applications are divided, and in the description of the global settings and the local environment snapshot backup, the environment details can be described in relatively more detail, while the description degree of the third party installation application is rather coarse. Wherein, the global settings only use the current setting value of the backup system; the local application records the UI hierarchical relationship, the individual setting items of the application, and the data currently being edited (if it is editable) by the user cached by the UI in accordance with the current usage status; the third-party installation application only records the operation object of the application, for example, the text editor only needs to record the name and the path of the document currently being edited.

Among them, the application manager maintains the relationship between the startup hierarchical relationship of the current application and the relationship between the tasks, which is an important feature of the current environment, and when selecting to recover an environment snapshot, it is also very important to recover the calling order and relationship of the applications in the environment snapshot, and when saving the environment snapshot, the application manager can save the call hierarchical relationship to be used in the environment snapshot recovery.

Among them, the users can select to save the current environment snapshot through the environment snapshot manager, and after an environment snapshot saving instruction is received, the environment snapshot manager saves the backup of the current global setting area, and then in turn sends the environment snapshot saving instruction to each application registered in the application manager. If it is a local application, each application records its own service setting items, such as the short message status report and the short message center number, and the UI call hierarchy, according to its own environment snapshot saving format, and if the UI has a user editing interface, it caches the editing data input by the UI user; if it is a third-party application, it caches the name and path of file object currently operated by the user. All the backup records are marked to be associated with the environment snapshot name.

Wherein, when the user selects to recover an environment snapshot, the environment snapshot manager recovers the global setting items, and then reads the environment record, and initiates environment snapshot recovery command to the application according to the up-down relationship of the list, and requires the application to recover and start up in accordance with the environment record. If it is a local application, the local application self-explains and recovers the environment records, recovers the UI hierarchical relationship and the data being edited by the user in the UI; the third-party installation application recovers and starts up by opening the corresponding file object. After the recovery is completed, the mobile terminal is restarted if necessary.

Wherein, since the environment snapshot can be understood as a snapshot used by the user to some extent, it can be associated with the environment snapshot saving in emergency situations such as low power, and thus it can play the role of the emergency recovery. If each applications environment snapshot is associated with the current data of the application when each application environment snapshot is saved, it plays the role of data backup at some time point.

Specifically, referring to FIG. 1, which is a flow chart of the method for mobile terminal environment snapshot management and backup recovery in the present invention, and said method comprises:

step 101: creating different environment snapshot settings, dividing terminal applications into: general local settings, local applications and third-party installation applications, presetting status saving formats of each application under different environment snapshot settings to be used for the application to recover accordingly under the different environment snapshot settings;

step 102: recording the activation hierarchical relationship and the call relationship between the applications under the different environment snapshot settings;

step 103: when saving the environment snapshot, saving the global configurations, and each activated application recording the current usage status as the environment record in accordance with the preset status saving format;

step 104: when recovering an environment snapshot, recovering the global configurations for the selected environment snapshot according to the saved global configurations, and then starting the applications one by one based on the environment record according to the activation hierarchical relationship and the call relationship between the applications in this environment snapshot.

Preferably, the step of each activated application recording the current usage status as a environment record in accordance with the preset status saving format comprises:

when the application is a general local setting, the environment record recording the terminal global configurations;

when the application is a local application, the environment record recording the application usage status, including one or more of the user interface hierarchical relationship, the commonly used configuration of the application, and the data cached and used on the top-layer page;

when the application is a third-party installation application, the environment record recording whether the third party installation application is activated or not and the object used by this application in a variety of environment snapshot settings.

In a preferred embodiment of the present invention, the step of each activated application recording the current usage status in accordance with the preset status saving format comprises: saving the data being edited.

In a preferred embodiment of the present invention, the method also comprises:

creating emergency environment snapshot setting, saving and restoring environment snapshot according to the emergency environment snapshot setting when an emergency event occurs.

Figure 2:
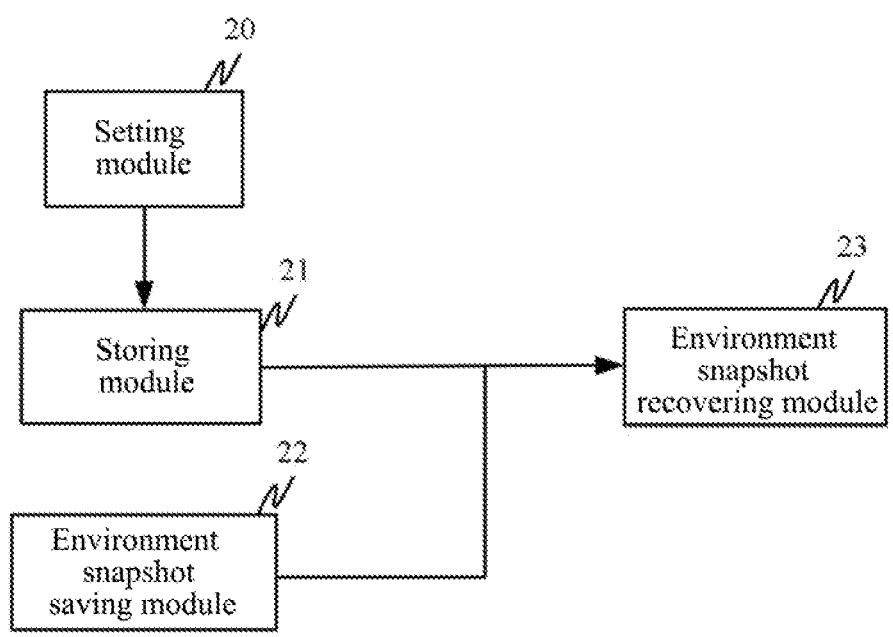
FIG. 2 is a structural diagram of a device for mobile terminal environment snapshot management and backup recovery in accordance with the present invention.

FIG. 2 shows a structural diagram of the device for mobile terminal environment snapshot management and backup recovery, and the device comprises:

the setting module 20, which is used to create different environment snapshot settings, and divide terminal applications into: general local settings, local applications and third-party installation applications, preset status saving formats of each application under different environment snapshot settings to be used by the applications to recover accordingly under the different environment snapshot settings;

the storing module 21, which is used to store the activation hierarchical relationship and the call relationship between the applications under the different environment snapshot;

the environment snapshot saving module 22, which is used to save the global configurations when saving the environment snapshot, where each activated application records the current usage status as a environment record in accordance with the preset status saving format;

the environment snapshot recovering module 23, which is used to, when recovering a environment snapshot, recover the global configurations for the selected environment snapshot according to the saved global configurations, and then start the applications one by one based on the environment record according to the activation hierarchical relationship and the call relationship between the applications under this environment snapshot.

The saving module 21 performs the function of the application manager, and the environment snapshot saving module 22 and the environment snapshot recovering module 23 perform the function of the environment snapshot manager.

In a preferred embodiment of the present invention, the environment snapshot saving module 22 is further used to:

when the application is a general local setting, record the terminal global configurations as the environment record;

when the application is a local application, record the local application usage status, comprising one or more of the user interface hierarchical relationship, the commonly used configuration of the local application, the data cached and used on the top-layer page, as the environment record;

when the application is a third-party installation application, record whether the third party installation application is activated or not and the object used by the third party installation application in each environment snapshot as the environment record.

In a preferred embodiment of the present invention, said environment snapshot saving module 22 is further used to save the data being edited.

In a preferred embodiment of the present invention, the setting module 20 is further used to create emergency environment snapshot setting, and correspondingly, the environment snapshot saving module 22 is further used to save the emergency environment snapshot when an emergency status occurs;

the environment snapshot recovering module 23 is further used to recover the emergency environment snapshot during the recovery after the emergency status occurs.

The present invention also provides a terminal that comprises the aforementioned device.

The technical solution of the present invention will be illustrated below with reference to the examples in the specific applications.

Figure 3:
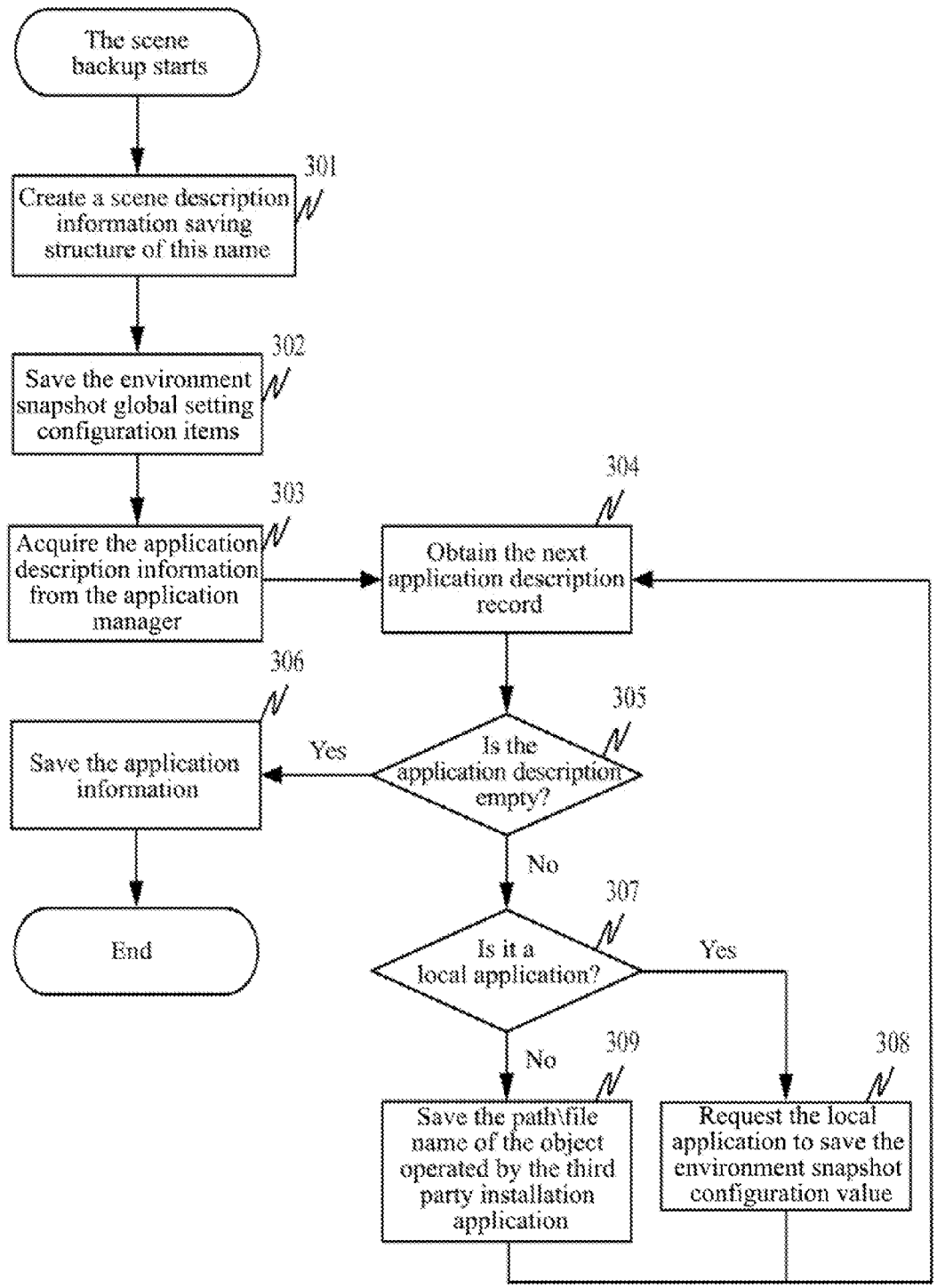
FIG. 3 is a flow chart of creating environment snapshot in accordance with an embodiment of the present invention.

In the following, a mobile terminal equipped with a smart operating system, a local application short message and a third-party installation application multimedia player will be taken as an example to describe the method for saving and recovering the mobile terminal environment snapshot in the present invention with reference to the accompanying figures. The following description is made with reference to the flow chart of scene backup in FIG. 3, the flow chart of scene recovery in FIG. 4, and the flow chart of local application environment snapshot recovery in FIG. 5.

Setting the environment snapshot saving object of a mobile phone consists of three sets: (1) setting applications, configured as the data structure in a non-volatile memory. (2) local applications, herein the SMS, and so on. 3. third-party installation applications, which are the media player and so on herein.

Step 301: Create a scene description information saving structure;

The status saving format description positioning of the three sets is as follows: 1. the setting application is: (attribute, value), the key value pair such as {{language, 1 (Chinese)}, {background image, "path\bg.file."}, { } ... }, this structure can be determined according to the original attributes, for example, the alarm clock may be {{alarm 1, 1 (activated), time, date, snooze at each 5 minute}, ... }. (2) the local application: which is a self-explanatory description structure, such as short message {{UI-1, main list, 0 (no data being edited by the user), NULL (user data)}, {UI-2 new short message, 1 (having data being edited by the user), data (data being edited by the user)}, ... }. (3) the third-party installation application description structure, for example, the media player is {1 (start to run), path\player.list (start to load the file object)}.

The application manager maintains the current application hierarchical relationship, which is 1. the media player, 2. the third-party installation application, and 3. the short message.

Step 302: The environment snapshot manager receives the environment snapshot saving command and saves the environment snapshot global setting configuration items;

Step 303: Create a timestamp as the environment snapshot description structure of the current time; acquire the application description information from the application manager;

step 304: obtain the next application description record;

Step 305: judge whether the application description is empty or not, if yes, proceed to step 306, otherwise proceed to step 307;

step 306: back up the current value of the setting, save the application information, and end;

step 307: judge whether it is a local application or not, if yes, proceed to step 308, otherwise proceed to step 309;

step 308: request the local application to save the environment snapshot configuration value, and proceed to step 304;

Step 309: save the path\file name of the object operated by the third party installation application, and proceed to step 304.

Therefore, by obtaining the application list, each application is circularly notified in turn to back up its own current status to form the respective application description structure of the local and third-party applications; and further back up the current application environment record.

Figure 4:
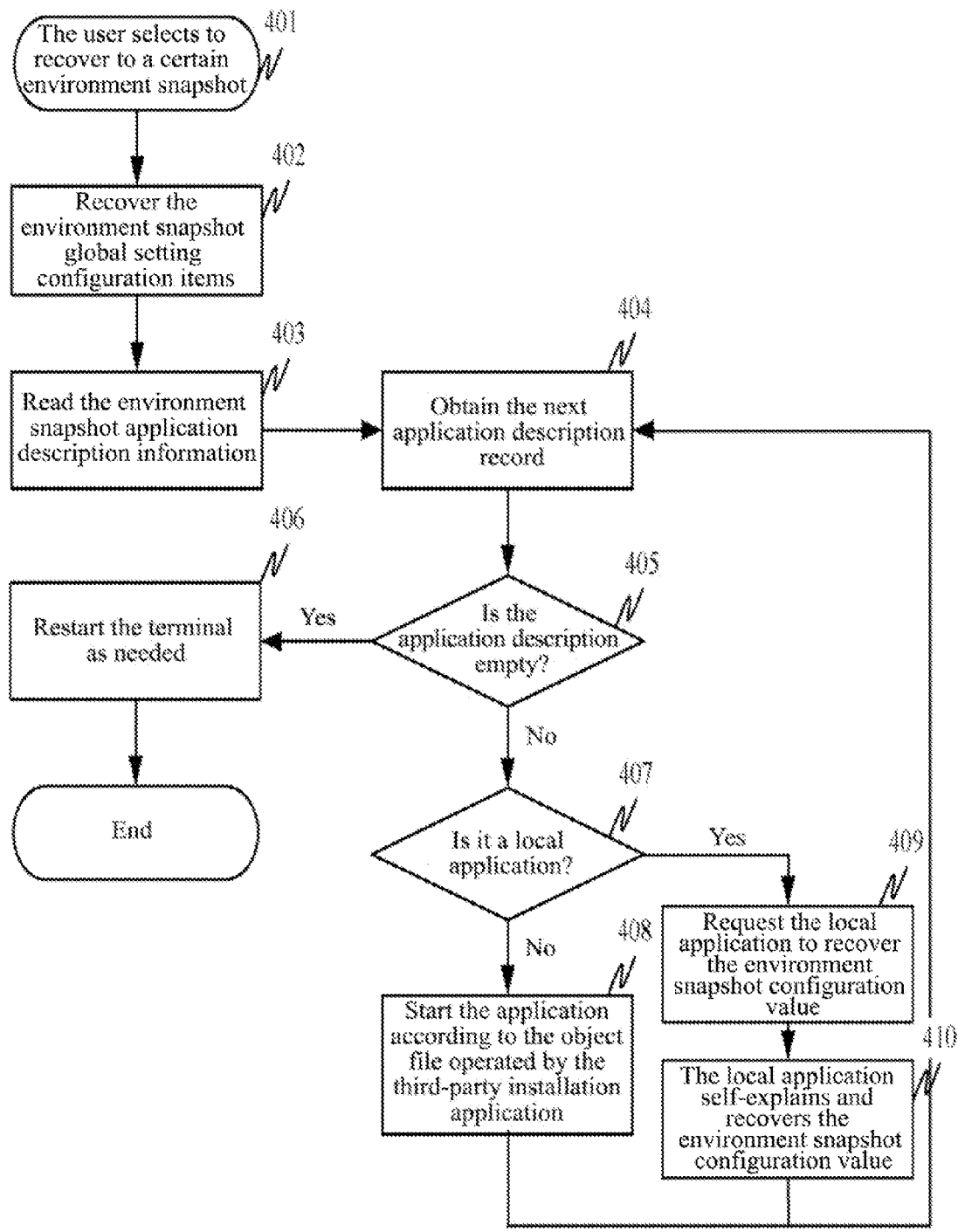
FIG. 4 is a flow chart of environment snapshot recovery in accordance with an embodiment of the present invention.

FIG. 4 is a flow chart of the environment snapshot recovery, and the process of the environment snapshot recovery comprises:

step 401: the user selects to recover to a certain environment snapshot;

step 402: recover the environment snapshot global setting configuration items; mainly comprising: recovering the setting configuration values of the environment snapshot, and if it is an alarm clock, clear the previous alarm clock setting and set the terminal according to the saved setting value;

step 403: extract the environment snapshot application description information, which is {media player, short message} here;

step 404: obtain the next application description record;

step 405: judge whether the application description is empty or not, if yes, proceed to step 406, otherwise proceed to step 407;

step 406: restart the terminal as needed, and end;

step 407: judge whether it is the local application or not, and if yes, proceed to step 409, otherwise proceed to step 408;

step 408: start the application according to the object file operated by the third-party installation application, and proceed to step 404;

step 409: request the local application to recover the environment snapshot configuration value;

step 410: the local application self-explains and recovers the environment snapshot configuration value, and proceed to step 404.

Therefore, during the environment snapshot recovery, all the applications are reset, and the applications are started in order; if it is the third-party installation application, the object operation file is taken as a parameter to start, the media player starts and loads the playlist file in the setting item to play; if it is a short message, whether the setting item corresponding to the scene name exists or not is judged, and then the application is started based on the sub-status description, the main interface is firstly started, and creation of the short message interface is started, and since creating the short message interface has the user cache data, the saved user data are inserted in the recipient and the text UI activeX.

Figure 5:
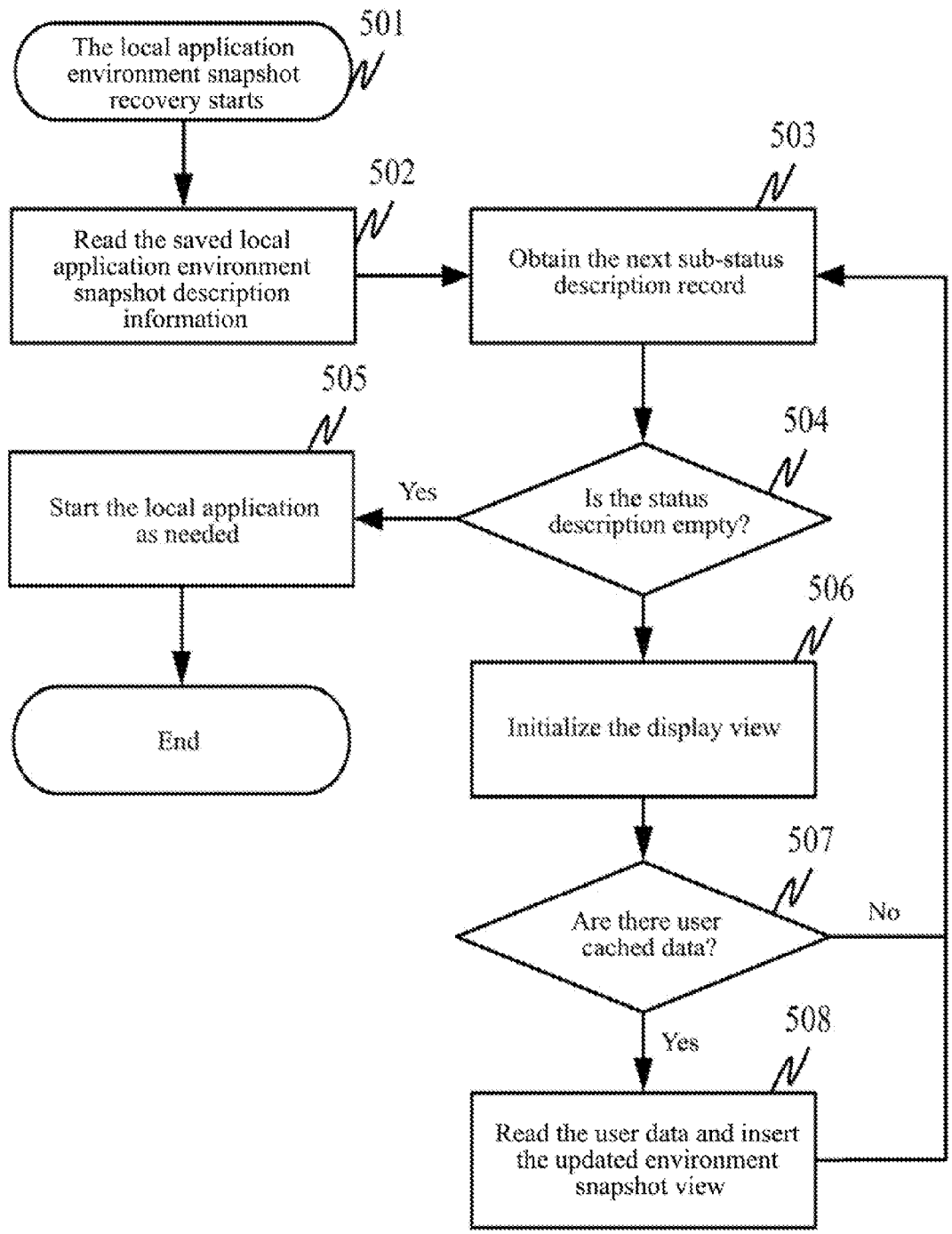
FIG. 5 is a flow chart of environment snapshot recovery of local applications in accordance with an embodiment of the present invention.

In the following, the flow chart of the local application environment snapshot recovery shown in FIG. 5 will be taken as an example to make description in detail. The process of the local application environment snapshot recovery comprises:

step 501: the local application environment snapshot recovery starts;

step 502: read the saved local application environment snapshot description information;

step 503: obtain the next sub-status description record;

step 504: judge whether the status description is empty or not, if yes, proceed to step 505, otherwise proceed to step 506;

step 505: start the local application as needed, and end;

step 506: initialize the display view;

step 507: judge whether there are user cached data or not, if yes, proceed to step 508, otherwise proceed to step 503;

step 508: read the user data and insert the updated environment snapshot view.

The method and device for mobile terminal environment snapshot management and backup recovery in the present invention can customize the user's mobile terminal usage environment snapshot to better unify the status recovery of the local applications and the third-party installation applications, to avoid the method for using the disk backup, which greatly enhances the availability of the mobile terminal in all aspects such as the user experience, system performance, and so on, and thereby facilitating the work and life of the mobile terminal users.

What is claimed is:

1. A method for mobile terminal environment snapshot management and backup recovery, the method comprising the steps of:

dividing objects for creating environment snapshots into three predefined sets: general local configurations, local applications, and third-party installations applications;

defining formats for saving object states of the objects of the mobile terminal;

creating one or more environment snapshot settings for configuring environment snapshots, wherein each environment snapshot setting includes at least the following information which is selected by a user:

(i) the defined formats to be applied to the objects, (ii) a sequence of activating the objects upon recovery, and (iii) relationships between the objects;

creating an environment snapshot according to a user-selected environment snapshot setting, the creating the environment snapshot further including:

saving a current global configuration of the mobile terminal into environment records based on the defined formats, saving current object states of the mobile terminal into environment records based on the defined formats, and saving the objects of the mobile terminal into environment records;

recovering the environment snapshot, the recovering the environment snapshot further including:

recovering the saved global configuration from the environment records, recovering the saved object states from the environment records, and activating the saved objects according to: (i) the sequence of activating the objects upon recovery, and (ii) the relationships between the objects.

2. The method according to claim 1, the method further comprising:

creating an environment snapshot setting according to a user selection of one or more of the predefined sets, wherein the general local configurations predefined set comprises the environment records saving fonts, backgrounds, theme styles, and telephone service ringtones of the mobile terminal, wherein the local applications predefined set comprises the environment records saving a user interface (UI) hierarchical relationship, commonly used configurations of the local applications, and data currently cached and used on a top-layer UI page of the mobile terminal, and wherein the third-party application installations predefined set comprises the environment records saving whether third-party installation applications of the mobile terminal are activated and objects used by the third-party installation applications.

3. The method according to claim 1, wherein saving current object states of the mobile terminal into environment records based on the defined formats comprises saving data being edited in the mobile terminal.

4. The method according to claim 1, the method further comprising:

creating an emergency environment snapshot setting;

creating an emergency snapshot according to the emergency environment snapshot setting upon a determination that an emergency event is occurring.

5. A mobile terminal with environment snapshot management and backup recovery function, the mobile terminal comprising:
- a mobile phone comprising a non-volatile memory and a plurality of modules;
- a setting module to:
  - divide objects for creating environment snapshots into three predefined sets: general local configurations, local applications, and third-party installations applications;
  - define formats for saving object states of the objects of the mobile terminal;
- a storing module to:
  - create one or more environment snapshot settings for configuring environment snapshots, wherein each environment snapshot setting includes at least the following information which is selected by a user:
  - (i) the defined formats to be applied to the objects, (ii) a sequence of activating the objects upon recovery, and (iii) relationships between the objects;
- an environment snapshot creating module to:
  - create an environment snapshot according to a user-selected environment snapshot setting, the creating the environment snapshot further including:
    - saving a current global configuration of the mobile terminal into environment records based on the defined formats,
    - saving current object states of the mobile terminal into environment records based on the defined formats, and
    - saving the objects of the mobile terminal into environment records;
- an environment snapshot recovering module to:
  - recover the environment snapshot, the recovering the environment snapshot further including:
    - recovering the saved global configuration from the environment records,
    - recovering the saved object states from the environment records, and
    - activating the saved objects according to: (i) the sequence of activating the objects upon recovery, and (ii) the relationships between the objects.

6. The mobile terminal according to claim 5, the storing module to further:
- create an environment snapshot setting according to a user selection of one or more of the predefined sets,
- wherein the general local configurations predefined set comprises the environment records saving fonts, backgrounds, theme styles, and telephone service ringtones of the mobile terminal,
- wherein the local applications predefined set comprises the environment records saving a user interface (UI) hierarchical relationship, commonly used configurations of the local applications, and data currently cached and used on a top-layer UI page of the mobile terminal, and
- wherein the third-party application installations predefined set comprises the environment records saving whether third-party installation applications of the mobile terminal are activated and objects used by the third-party installation applications.

7. The mobile terminal according to claim 5, the environment snapshot creating module to further save data being edited in the mobile terminal.

8. The mobile terminal according to claim 5, the setting module to further:
- create an emergency environment snapshot setting;
- create an emergency snapshot according to the emergency environment snapshot setting upon a determination that an emergency event is occurring.

* * * * *